United States Patent
Miller

(10) Patent No.: US 7,313,850 B2
(45) Date of Patent: Jan. 1, 2008

(54) COMPACT, ECONOMICAL, MULTI-AXIS, MULTI-TASKING, SMALL PART MACHINE TOOL

(76) Inventor: Lee Norris Miller, 5928 Gate House Dr., Glen Allen, VA (US) 23059-2600

( * ) Notice: Subject to any disclaimer, the term of this patent is extended or adjusted under 35 U.S.C. 154(b) by 0 days.

(21) Appl. No.: 11/412,932

(22) Filed: Apr. 28, 2006

(65) Prior Publication Data

US 2006/0257218 A1 Nov. 16, 2006

Related U.S. Application Data

(60) Provisional application No. 60/681,136, filed on May 16, 2005.

(51) Int. Cl.
*B23P 23/00* (2006.01)
(52) U.S. Cl. ...................... 29/37 A; 29/27 C; 409/165; 82/129
(58) Field of Classification Search ............... 29/37 A, 29/27 C, 27 R; 82/137, 138, 129, 158–159; 409/165–166, 235
See application file for complete search history.

(56) References Cited

U.S. PATENT DOCUMENTS

| 4,759,244 | A | * | 7/1988 | Engibarov | .................. 82/154 |
| 4,831,906 | A | * | 5/1989 | Sugimoto et al. | .............. 82/118 |
| 4,949,443 | A | * | 8/1990 | Saruwatari et al. | ......... 29/27 C |
| 5,092,206 | A | * | 3/1992 | Ronzoni | ...................... 82/158 |
| 6,311,591 | B1 | * | 11/2001 | Grossmann | .................. 29/27 C |
| 6,571,671 | B1 | * | 6/2003 | Giannetti | ...................... 82/160 |
| 2003/0126728 | A1 | * | 7/2003 | Watanabe | ................ 29/48.5 R |
| 2004/0049902 | A1 | * | 3/2004 | Hagstrom | .................... 29/26 A |

FOREIGN PATENT DOCUMENTS

JP 10-128608 A * 5/1998

* cited by examiner

*Primary Examiner*—Erica Cadugan
(74) *Attorney, Agent, or Firm*—Whitham, Curtis, Christofferson & Cook, PC

(57) ABSTRACT

A compact, economical, and easy-to-use small parts machine tool that can machine small parts from bar stock as well as castings, forgings, slugs, and near net shape raw materials, is comprised a base with a spindle for moving a workpiece, a first carriage connected to the base that moves along a Z axial direction, a second carriage connected to the first carriage that moves along a Y axial direction, a third carriage connected to the second carriage that moves along an X axial direction, and a tool holder system that holds a plurality of machining tools.

20 Claims, 7 Drawing Sheets

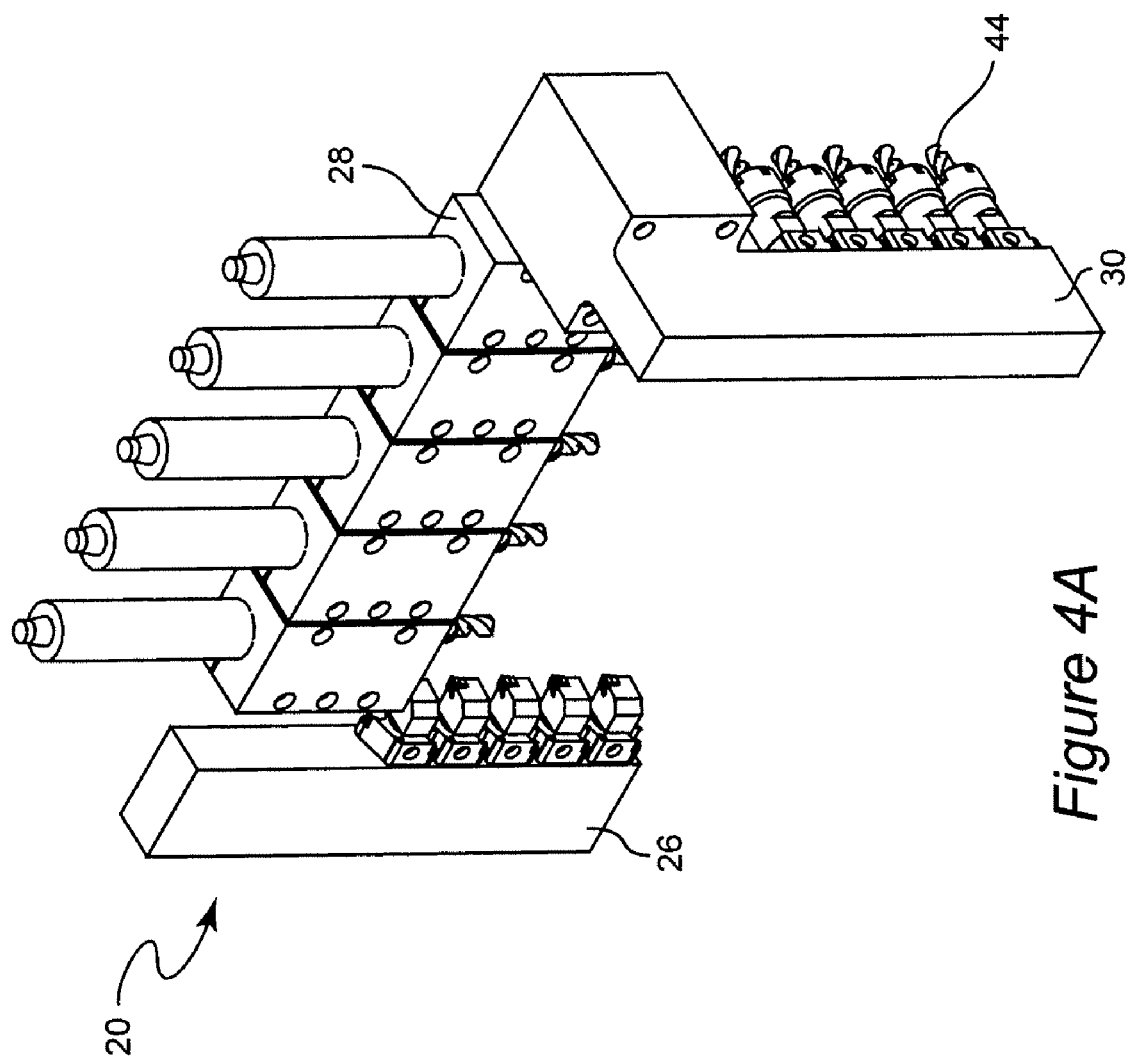

COMPACT, ECONOMICAL, MULTI-AXIS, MULTI-TASKING, SMALL PART MACHINE TOOL

CROSS-REFERENCE TO RELATED APPLICATIONS

This application claims priority to the provisional application filed May 16, 2005, having U.S. Provisional Patent Application Ser. No. 60/681,136, and the complete contents of that application are herein incorporated by reference.

BACKGROUND OF THE INVENTION

1. Field of the Invention

The present invention generally relates to a tool for machining small component parts and, more particularly, to a compact, multi-axis, multi-tasking small part machine tool.

2. Background Description

Practically every major industry today has the need for miniature component parts. For example, in the electronics and computer industries, smaller means faster information transfer, which results in higher input, output, and processing rates, and is particularly important in structures for mounting and interconnecting chips and for heat transfer. In the medical industry, smaller biomedical devices mean less invasive surgical procedures, thus resulting in quicker patient recovery times. In the aerospace industry, smaller aerospace components mean lighter weight and less space, thus resulting in larger potential payloads and/or improved performance. In the automotive industry, smaller automotive components reduce weight, thus increasing fuel efficiencies. As for consumer products, smaller means greater portability and convenience. Regardless of the industry, the demand for making things smaller is growing rapidly and manufacturers face continual challenges in making small components.

Milling machines, both CNC (Computer Numerical Control) and manually operated, remove material from flat surfaces, recesses and apertures of a stationary workpiece utilizing a rotating, multipoint, traveling cutting tool. Parts often require more than just one cutting tool to complete, so several cutting tools may be placed into and taken out of the milling spindle manually or by use of an automatic tool changer. Another option, if more than one cutting tool is required, is to "gang" two or more milling spindles onto a longer traveling slide to enable using each tool without necessitating removal of any given tool from its spindle. Milling machines with CNC controls and automatic tool changers are commonly referred to as machining centers. Milling machines and machining centers normally have three linear axes of motion, but can also have one or more rotary axes of motion as well. However, milling machines are not well-suited to forming radially symmetrical surfaces with high precision.

Lathes generally remove material from a rotating workpiece utilizing a traveling, single point cutting tool and can do so with much improved precision compared with milling machines for non-planar surfaces. When more than one cutting tool is required, the cutting tools can be changed manually, automatically or "gang tooled" onto a slide whereby each tool can be utilized by simply changing the axis position. Lathes with CNC controls and tool turrets are commonly referred to as turning centers. Lathes generally have two linear axes of motion, but can have rotary axes (generally used to control spindle positioning) and additional linear axes as well (e.g., a third axis can be added to the main tool slide for what is commonly called a "Y-axis" turning center or an additional tool slide with two more axes of movement can be added to make a "four-axis" turning center). Because many lathes used to machine small parts are primarily intended for hobby shop or home shop machining, they are not well suited for industrial applications.

Traditionally, lathes are used to machine round parts and milling machines are used to machine prismatic parts or part features. Turned parts with milled features are typically machined in a lathe and are then transferred to a milling machine to have those operations performed. However, for smaller components, handling, re-orienting, and re-fixturing and/or chucking the part for a second or third machining operation becomes extremely difficult and a source of potential error or inaccuracy. It is much easier and more expeditious to complete the part, including all turning and milling operations, in one set-up and machining operation which also removes a source of error. The ability to perform turning and milling operations in one machine, is commonly referred to as multi-tasking.

Although industrial machines do exist that perform both types of operations, such as CNC controlled Swiss-type machines for small parts, these machines often require multiple duplicate axes to perform these additional operations. Each axis is primarily comprised of the following parts: the machined slide casting, a set of linear guide ways and trucks, a ball screw and nut, ball screw support bearings, servo motor, servo drive, coupling, a set of pulleys, a timing belt, electrical wiring, and fasteners. This requirement tends to sacrifice simplicity for higher production rates and/or the ability to multi-task. However, market demand for product customization often supplants the need for higher production rates and thus increases the importance of simplicity, flexibility, and reduced set-up times. Furthermore, in large part due to their numerous axes, Swiss-type machines are quite expensive.

Further, manufacturers may also be restricted by the type of raw material they may use when machining small parts. For example, since the operation of Swiss-type screw machine depends on the utilization of bar stock as the raw material, this precludes manufacturers who are utilizing these machines from manufacturing small parts formed by castings, forgings, sawed bar stock slugs, or newer, near net shape raw material alternatives (e.g. metal injection moldings).

Small part machining also has a need for a machine tool design that is very compact. There are many benefits for a compact small part machine tool including, but not limited to, simplicity, rigidity, economics of design, less use of floor space, and more efficient machine movements. Although these are important criteria for all machine tool designs, compactness is especially critical when designing a machine tool for small part machining. At this reduced scale, cutting tools and tool holders tend to interfere with work holding devices, other cutting tools or tool holders, or parts of the machine tool itself. In order to avoid such interference, the tools or workpiece are frequently extended from their collets or holding devices and left unsupported. This leads to the possibility of tool and workpiece flexing, vibration, breaking, etc. A more compactly designed machine tool reduces both interferences and the undesirable necessity of tool and/or workpiece extension while providing better tool rigidity or reduced flexure.

SUMMARY OF THE INVENTION

It is therefore an object of the present invention to provide a compact, economical, and easy-to-use small parts machine tool that could machine small parts from bar stock as well as castings, forgings, slugs, and near net shape raw materials.

For purposes of this invention, a small part is defined as one that is of dimensions such that there is no significant deflection of a workpiece due to gravity or force of the machine tool against the workpiece of which the small part is formed. Although the present invention primarily addresses small parts, the applications and dimensions of the machine can be modified for machining larger parts.

According to the present invention, the machine tool includes a base comprising an arrangement such as a chuck, often referred to as a spindle, for moving or positioning a workpiece rotationally about an axis with respect to the length of the base (C coordinate direction). Preferably, the base further comprises a sliding means that mounts or otherwise connects to slides formed on a first carriage (Z carriage). When connected, the Z carriage moves in a reciprocal direction along the length of the base (Z coordinate direction). Preferably, the Z carriage also includes a sliding means that mounts or otherwise connects to slides formed on a second carriage (Y carriage). When connected, the Y carriage moves in a vertical reciprocal direction (Y coordinate direction). Further, the Y carriage also includes a sliding means that mounts or otherwise connects to slides formed on a third carriage (X carriage). When connected, the X carriage moves in a horizontal reciprocal direction (X coordinate direction). Lastly, the X carriage includes grooves, "T" slots or a series of tapped holes that supports a tool holder system. Because the machine preferably incorporates only four axes (i.e., X, Y, Z, and C), cost of assembly, as well as size, is greatly reduced as compared to the prior art discussed above. The machine can also be manufactured with a fifth axis wherein one or more tools are moved rotationally about an axis preferably parallel to the X carriage movement and in a direction perpendicular to the length of the X carriage (A coordinate direction). This can be accomplished either by tilting the X carriage, thus tilting all tools attached to a particular tool block, or by tilting the tools themselves.

When the machine tool is assembled, the tool holder system is situated over the workpiece which is held by the spindle. Preferably, the tool holder system is comprised of a plurality of tool blocks, each block holding a plurality of detachable, powered rotating tools, static tools, or other types of tools used in milling, drilling, and turning operations. A first tool block contains a plurality of tools that are held in the X coordinate direction (X tool block). A second tool block contains a plurality of tools that are held in the Y coordinate direction (Y tool block). A third tool block contains a plurality of tools that are held in the Z coordinate direction (Z tool block). Although the present invention addresses machining a workpiece with three tool blocks, the number of tool blocks can be greater or less depending on the part to be machined. Further, although the present invention addresses each tool block containing a plurality of tools held in a particular coordinate direction, the tool blocks can be manufactured to hold a plurality of tools in more than one coordinate direction and/or on more than one face of a tool block. The tool blocks can also be manufactured to hold a single tool rather than a plurality of tools. A tool block that can rotate a single tool or plurality of tools along the A coordinate direction can be incorporated within the spirit and scope of the present invention.

The tool blocks are connected to or assembled using grooves, "T" slots or a series of tapped holes on the X carriage and are placed above the workpiece to be machined. Because of this placement, nothing is below the workpiece. Accordingly, shavings fall to the ground thus preventing damage to the tools. Interference with tool changing is also reduced due to the placement of the tool blocks in accordance with the present invention.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A and 4B are front and rear views of the tool holder system for a small parts machine tool in accordance with the present invention;

DETAILED DESCRIPTION OF A PREFERRED EMBODIMENT OF THE INVENTION

Figure 1:
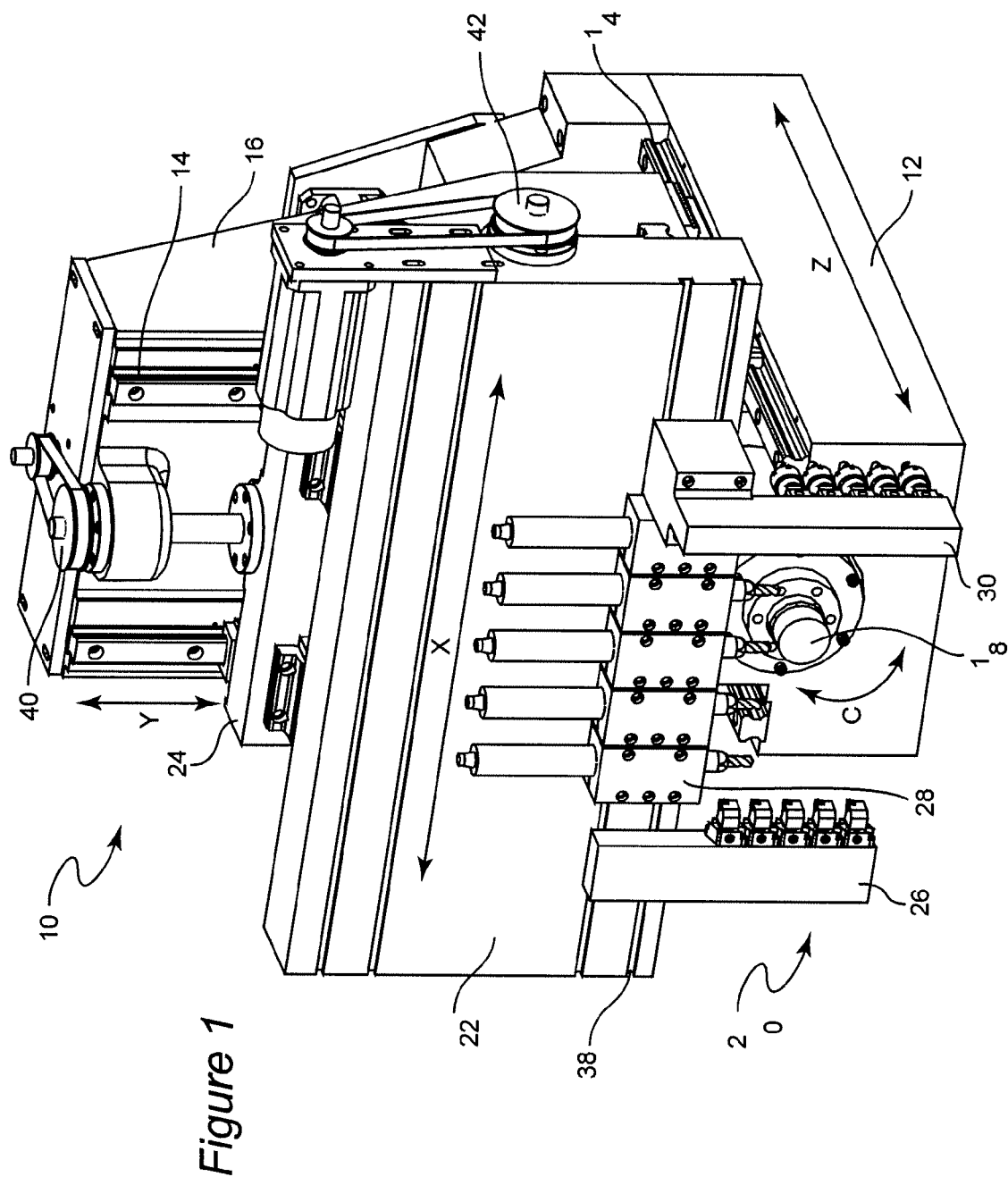
FIG. 1 is an illustration of the small parts machine tool in accordance with the present invention.
Figure 2:
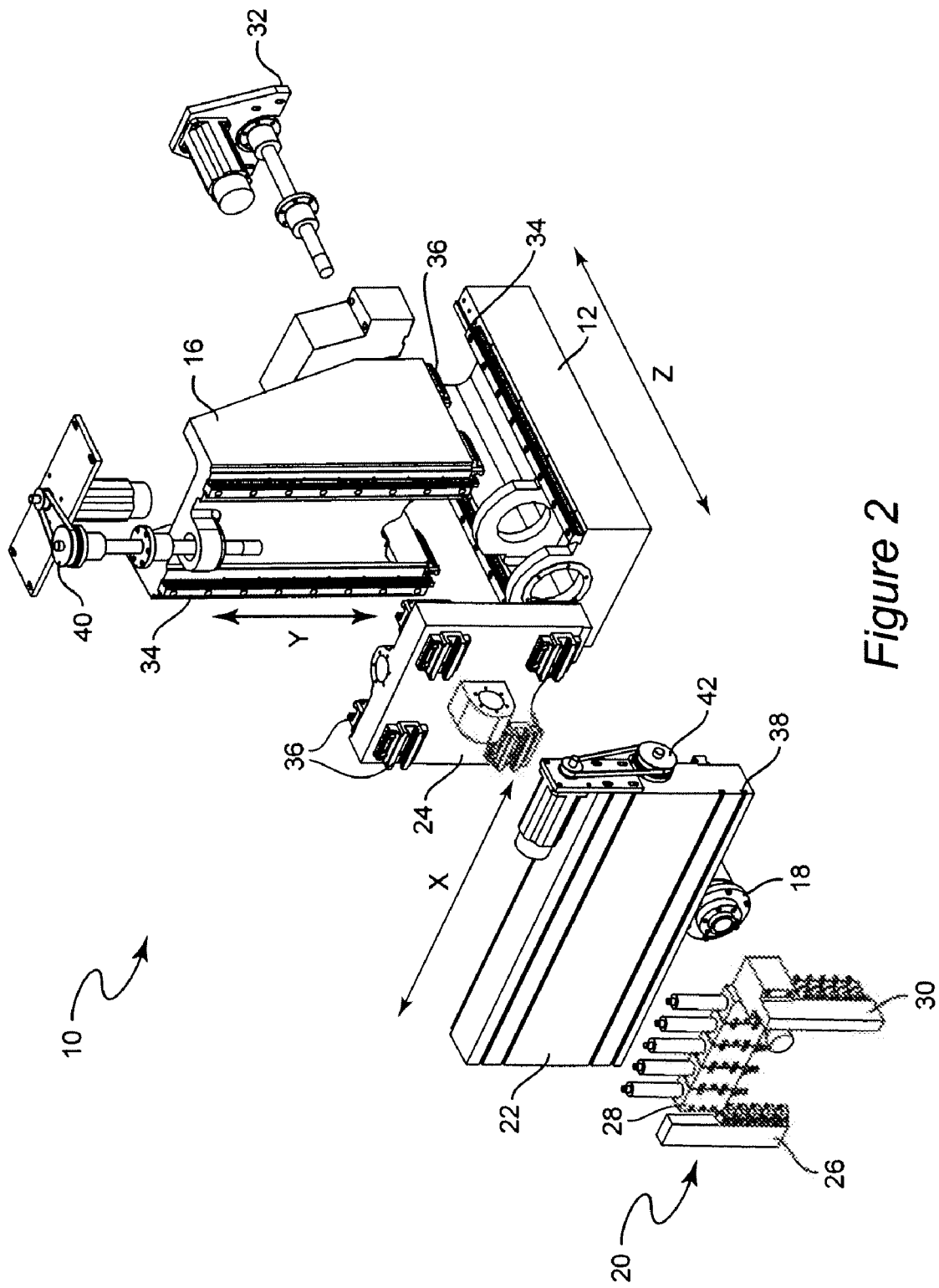
FIG. 2 is an exploded front view of the small parts machine tool in accordance with the present invention.
Figure 3:
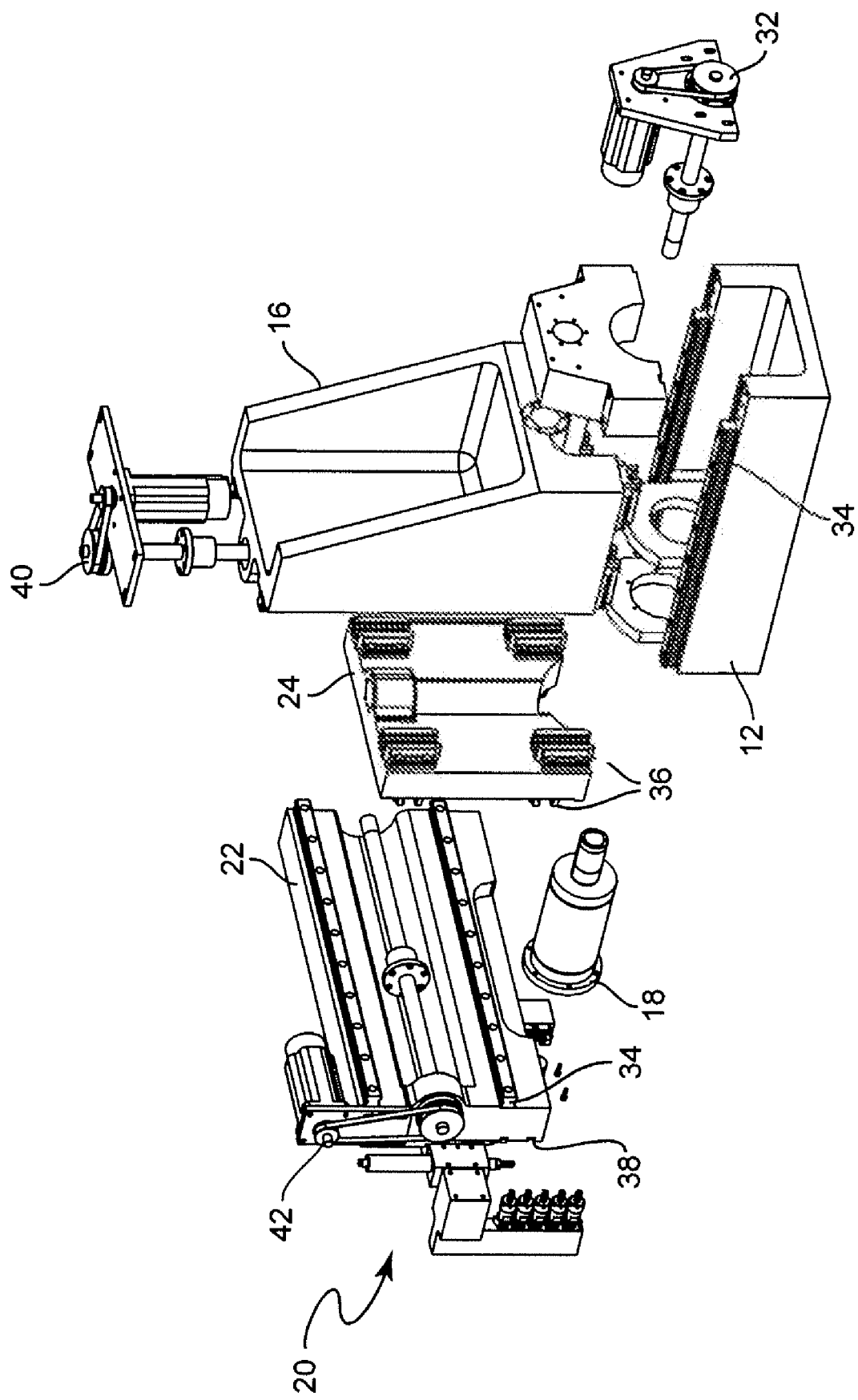
FIG. 3 is an exploded rear view of the small parts machine tool in accordance with the present invention.

Referring now to the drawings, and more particularly to FIGS. 1, 2 and 3, there is shown a small parts machine tool according to the present invention. The small parts machine tool 10 is comprised of a base 12, an X carriage 22, a Y carriage 24, a Z carriage 16, and a tool holder system 20. The base 12 includes a spindle 18 at one end that secures and holds a workpiece to be machined. The spindle 18 holds the workpiece over the edge of the base. The spindle 18 also serves to rotate the workpiece in the C coordinate direction, which is designated by the arrow C in FIG. 1. This rotary motion may be indexed at desired rotational positions or provide a continuous rotary motion at a selected or variable speed.

The base 12 is further comprised of a sliding rail arrangement 14 that physically controls the direction of the Z carriage 16 along the Z coordinate direction, which is designated by the arrow Z. While the Figures show only linear motion guide ways as the exemplary sliding rail arrangement, other types of sliding arrangements may be used within the scope of the invention (e.g., hydrostatic ways, square-edged sliding ways, dove-tail sliding ways, linear bearings, linear guide ways, fluid or gas bearings, etc.) and may include mechanisms for locking the carriage at any location. As shown in FIGS. 2 and 3, the base 12 includes, for example, two tracks 34 that run parallel to each other along the length of the base 12. Each of these tracks 34 slidably engage with slides or bearings 36 that are formed on the Z carriage 16. The contact between the tracks 34 and slides or bearings 36 (FIG. 2) preferably form a clamp-type locking connection that allows for easy assembly, as well as easy removal for repair. Further, a Z drive motor 32 is provided to control movement along the Z axis parallel to arrow Z. The drive motor is preferably operated by a Machine Control Unit (MCU) (not shown) that is well known in the art, but could be operated manually with or without omission of motor 32.

The Z carriage 16 is also comprised of a sliding rail arrangement 14 that physically controls the direction of the Y carriage 24 along the Y coordinate direction, which is designated by the arrow Y. As previously mentioned, the Figures show only linear motion guide ways as the exemplary sliding arrangement which may be considered to represent guides or bearings such as those mentioned above. As shown in FIGS. 2 and 3, the Z carriage 16 includes two tracks 34 that run in a direction orthogonal to the tracks formed along the length of the base 12. For purposes of this invention, orthogonal is defined as independent, but not necessarily, perpendicular. Each track 34 on the Z carriage 16 slidably engage with slides 36 formed on Y carriage 24. Again, the contact preferably forms a clamp-type locking connection. Further, a Y drive motor 40 is provided to control the axis of movement along arrow Y, which is operated by a MCU but, again, can be performed manually.

The Y carriage 24 is also comprised of a sliding rail arrangement that physically controls the direction of the X carriage 22 along the X coordinate direction, which is designated by the arrow X. As previously mentioned, the Figures show only linear motion guide ways as the exemplary sliding rail arrangement. As shown in FIG. 3, the X carriage 22 includes two tracks 34 that run in a direction orthogonal to the tracks formed on the Z carriage 16. Each track 34 on the X carriage 22 slidably engage with slides 36 formed on Y carriage 24. Again, the contact preferably forms a clamp-type locking connection. Further, a X drive motor 42 is provided to control the axis of movement along arrow X, which is operated by a MCU.

Figure 6A:
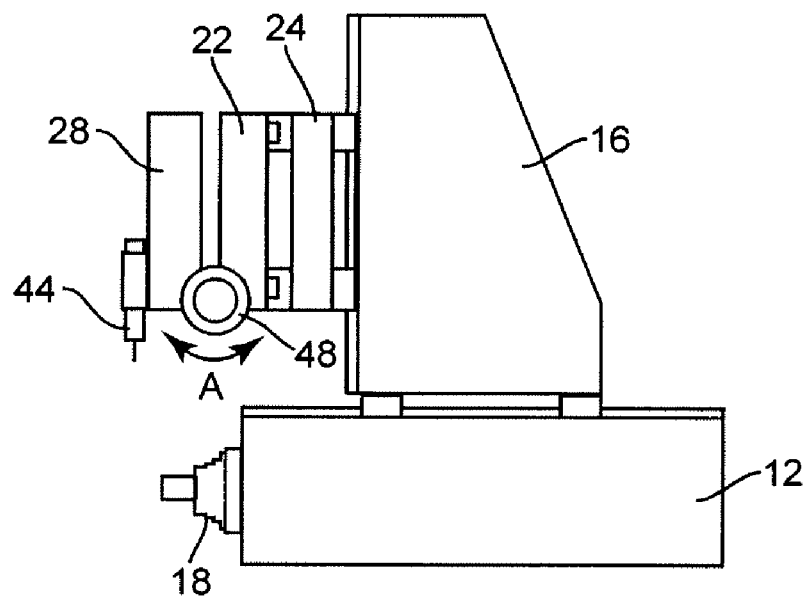
FIGS. 6A and 6B are side views illustrating the operation of the small parts machine tool in the A coordinate direction.
Figure 6B:
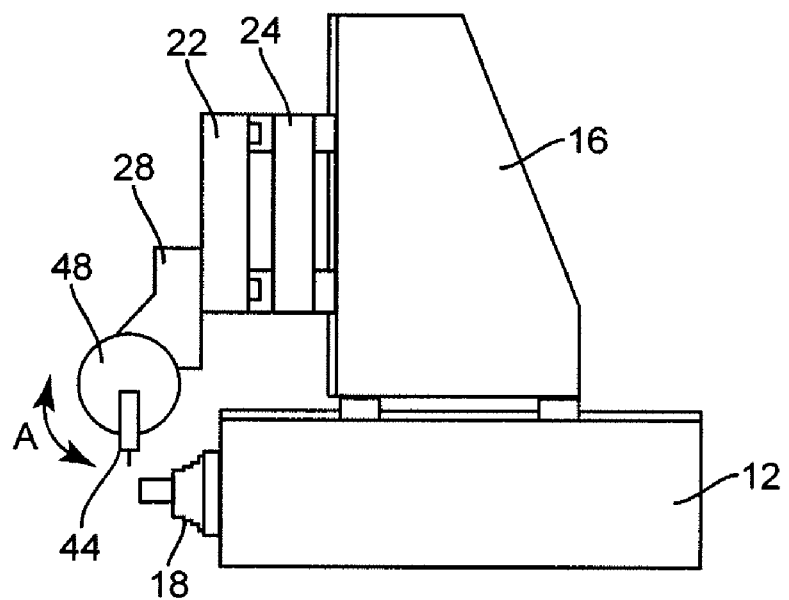

A fifth axis can also be incorporated within the scope of the present invention. In FIG. 6A, the Y tool block 28 is attached to the X carriage 22 by a pivotable linkage 48. While FIG. 6A show only the Y tool block by way of example, the other tool blocks may be used within the scope of the invention. The pivotable linkage 48 allows the entire tool block to move along the A coordinate direction, which is designated by arrow A. Alternatively, as shown in FIG. 6B, a single tool 44, or a plurality of tools, are attached to a single or plurality of tool blocks by a pivotable linkage 48, thus allowing the tool 44 to move along the A coordinate direction.

The tool holder system 20 is comprised of a mounting means to mount each tool to the grooves 38, individually or in blocks, which are preferably formed along the entire length of the X carriage 22 so that, for example, "T" shaped openings are on either end (see FIG. 3). While only T-slot guide ways are shown as the exemplary mounting means, other types of mounting means may be used within the scope of the invention (e.g., square-edged guide ways, dovetail guide ways, series of tapped holes, etc.). The mounting means are inserted through the groove opening 38 and manually slid until it reaches a desired location. The desired location is dependant on which tool block of the tool holder system 20 is being mounted, which will be discussed later.

Figure 4B:
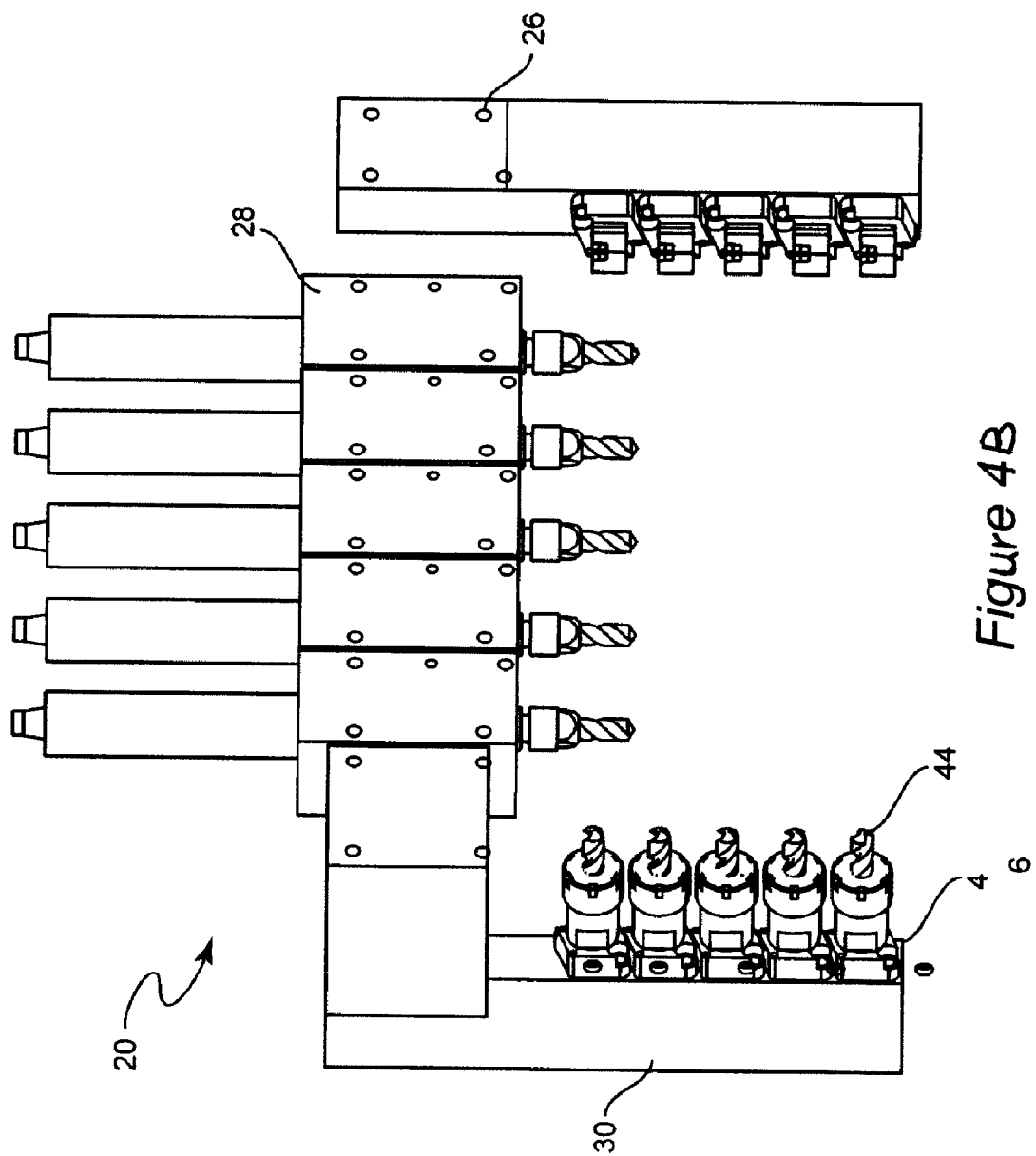

Referring now to FIGS. 4A and 4B, there is shown a tool holder system 20 in accordance with the present invention. The tool holder system 20 is comprised of at least one tool block (e.g., 26, 28, 30). While FIGS. 4A and 4B show a plurality of tool blocks along three axes as the exemplary use in the small parts machine tool, the number and placement of tool blocks could vary within the scope of the present invention. A tool block can be formed by mounting individual tools (with or without drive arrangements) on X carriage 22 or on separate structures 26', 30' allowing attachment to X carriage 22 as a unit. Also, the types of tools can vary as to each axis of tool block. As shown in FIGS. 4A and 4B, the tool holder system 20 includes an X tool block 26, a Y tool block 28, and a Z tool block 30.

The X tool block 26 is positioned along the grooves 38 on the X carriage 22 (shown in FIGS. 1 and 2) then secured. There can be a single X tool block or plurality of X tool blocks, as shown in FIGS. 4A and 4B. When attached, the tools 44 attached to the X tool block 26 lay to the side of the workpiece to be machined and are moveable against the side of the workpiece. The Y tool block 28 is also positioned along the grooves 38 on the X carriage 22. When attached, the tools 44 attached to the Y tool block 28 lay above of the workpiece to be machined and are moveable against the side of the workpiece along arrow X. Lastly, the Z tool block 30 is positioned along the grooves 38 on the X carriage 22. When attached, the tools 44 attached to the Z tool block 30 lay so that they are facing in the direction of the end of the workpiece to be machined. During operation, because the carriages 22, 24, 16 are interconnected, the tools are capable of moving along any or all of the three axes, as well as the optional $5^{th}$ axis. Thus, the tools are above or to the side of the workpiece to prevent material from the workpiece falling on the tools or carriage and limiting residue falling on the surface being machined by another tool.

Each tool block is comprised of a plurality of attachment means (or chucks) 46 for attaching a plurality of milling, turning, drilling, etc., tools. While the Figures show a plurality of attachment means 46 on only one face each respective tool block, attachment means 46 can be formed on each face of each respective tool block within the scope of the present invention. Further, the number and type of tools could vary depending of the requirements for each workpiece to be machined within the scope of the present invention. For exemplary purposes, FIG. 4B shows the attachment means to include a clamping unit which preferably has a quick change tapered shank 46, which is known in the art. Alternatively, a round or square shank tool holder or chuck can also be used. Each individual tool 44 has a corresponding tapered shank of approximately the same size and shape of the chuck or collet interior. Thus, when inserted into the attachment means 46, the tool 44 is rigidly held by a clamping unit. Further, the tapered shank is self-centering resulting in ease of loading and unloading of each individual tool and accurate and repeatable positioning thereof. This helps reduce tool changeover time as compared to the prior art (i.e., from approximately 5 minutes to 30 seconds or less, compared to square shank tool holders).

It should be noted that the Y carriage 24, the X carriage 22 and any carriage used to provide a fifth axis, as well as a tool holder all have dimensions extending in the direction of z-axis movement and are positioned by the Z-carriage 16 and that at least the Y and X carriages 24, 22 and the tool holder do not provide for movement of the tools in the Z direction. It is considered desirable that the Z, Y and X (and fifth axis, if provided) carriages 16, 24, 22 be configured in regard to their respective sizes such that the maximum length of the small part to be machined can be reached without extending the slides or ways of the Z-carriage beyond the point, in the Z direction where the spindle 18 engages the workpiece. That is, the slides or ways for the Z-carriage 16 should not extend beyond the point at which the spindle 18 engages the workpiece in the direction in which the workpiece extends from the spindle 18 in the Z direction and are preferably slightly recessed therefrom but only extend in the opposite direction parallel to the Z axis from the location at which the spindle 18 engages the workpiece and constitutes a limit on the locations on the workpiece where machining can be performed. Preferably, this configuration is achieved, as illustrated, by providing for the spindle 18 to extend beyond the perimeter of the base 12 while the ways are confined within the base perimeter.

Such a configuration provides for little, if any, of the material removed from the workpiece coming to rest on the Z carriage slides or ways to prevent malfunctioning or damage to the small parts machine tool 10 in accordance with the invention or damage to the workpiece due to interference with motion of the carriages in the Z direction which is of particular importance where the machine tool is numerically controlled and carriage movements are generally carried out at high speed. Such a configuration also substantially assures that any flexure of the assembled carriages and tool holder will be negligible in comparison with flexure of the workpiece since both the workpiece and the assembled carriages are both cantilevers of the same maximum length of a small part as defined above. Moreover, any deflection which occurs due to gravity will be in the same direction for the cantilevers of both the workpiece and the assembled carriages (and could even be matched, if desired, by design of the tool holder) and, when it is appreciated that completion of a machining operation reduces the force of the machine tool upon the workpiece to zero, it can be understood that such a configuration necessarily provides improved machining accuracy (and predictability and repeatability thereof) over machine tools of known design where the slides or ways for movement of tools in the Z direction extend in the same direction as the workpiece.

When in operation, a single tool, or plurality tools, may be powered while the other tools remain stationary. Further, the spacing between the tools on each tool block can be adjusted depending on the workpiece to be machined. For example, the spacing can be adjusted to be greater than the size of a workpiece so that only a single tool is used in the machining process. The spacing can also be adjusted so that two or more tools can simultaneously machine the workpiece in several locations.

Figure 5:
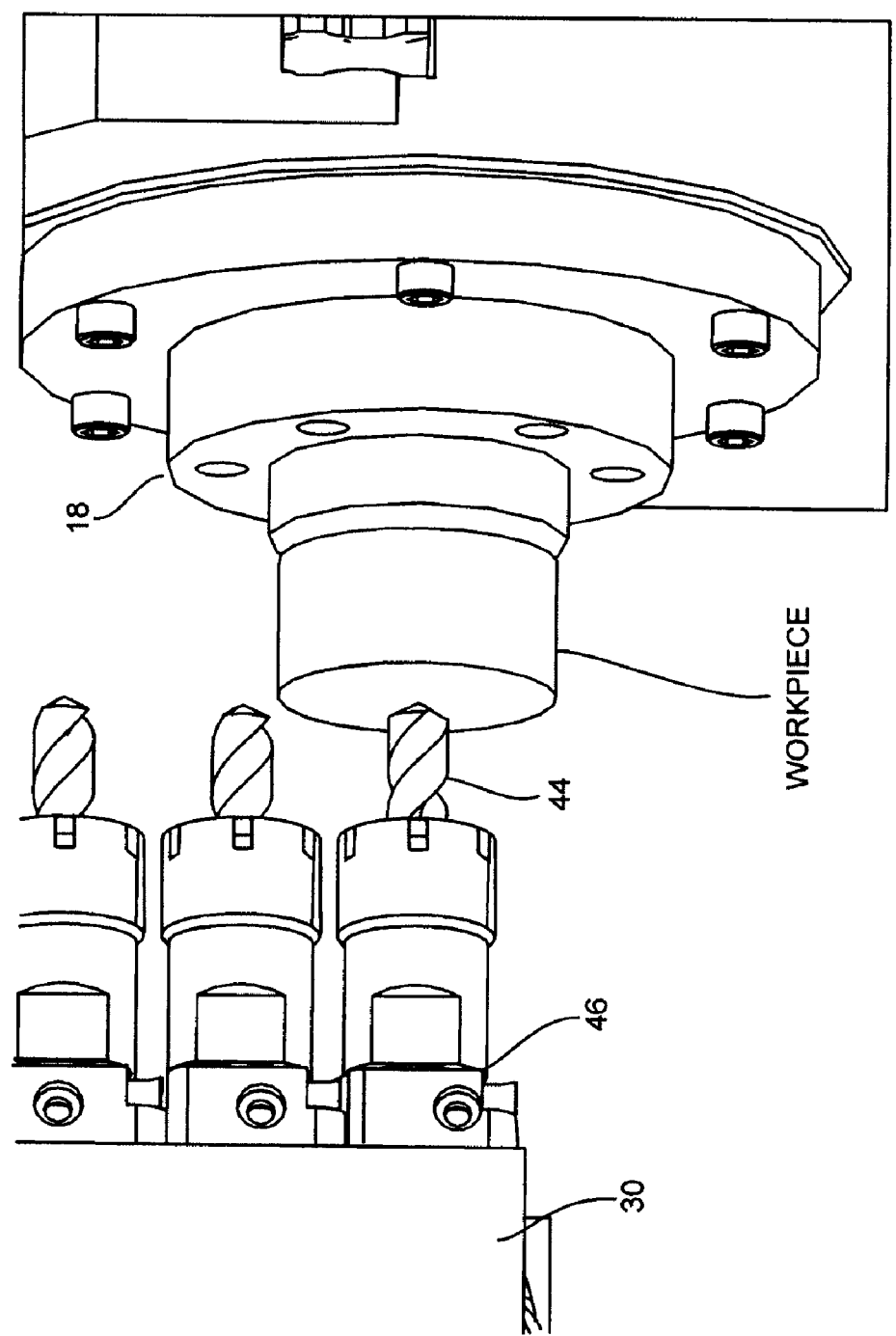
FIG. 5 is an enlarged illustration of the operation of the Z tool block in accordance with the present invention.

Referring now to FIG. 5, there is shown, by way of example, an enlarged view of how the Z tool block 30 operates with respect to a workpiece to be drilled. While FIG. 5 shows only a drilling operation along the Z axis, other types of machining operations may be used within the scope of the invention (e.g., milling, turning, etc.). A workpiece is fed, either manually chucked or mechanically loaded, into or through the spindle 18 so that a desired portion to be drilled is exposed towards the tools 44. Typically, bar stock is fed through the spindle 18 from the rear of the base 12, while individual units of raw material (e.g., slugs, forgings, castings, etc.) are fed into the front of the spindle 18. As shown in FIG. 5, a drilling tool 44 is positioned to drill a hole in the center of the workpiece. To achieve this, the MCU (not shown) sends a signal to the Z drive motor 32, as shown in FIGS. 2 and 3, to move the Z carriage 16 along the Z axis so that the tool 44 drills a hole in the workpiece. If another hole was to be drilled to the left of the center hole, then the MCU sends a signal to the X drive motor 42 to move the X carriage 22 along the X axis to the desired hole location. Further, if yet another hole was to be drilled above the center hole, then the MCU sends a signal to the Y drive motor 40 to move the Y carriage 24 along the Y axis to the desired hole location. The same operation and movement principles apply for the X tool block 26 and Y tool block 28.

In view of the forgoing, it is seen that the small part machine tool can maintain superior compactness while reducing interferences, providing better tool rigidity and reduced flexure. Further, because nothing is below the workpiece, shavings that result from the drilling fall to the ground, thus preventing damage to the tools, or workpiece, or components of the machine tool.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A machine tool, comprising:
   a base;
   a means attached to said base for moving or positioning a workpiece rotationally about an axis, said workpiece extending from said means in a workpiece direction, wherein said workpiece direction is parallel to said axis;
   a first carriage mounted on said base above said means and reciprocally movable in a first coordinate direction on a first guiding structure beginning at an end of the means for moving or positioning the workpiece and extending therefrom in a direction opposite said workpiece direction, wherein said first coordinate direction is parallel to said axis;
   a second carriage mounted on said first carriage reciprocally movable in a second coordinate direction orthogonal to said first coordinate direction; and
   a third carriage mounted on said second carriage reciprocally movable in a third coordinate direction orthogonal to said first coordinate direction and second coordinate direction.

2. A machine tool according to claim 1, wherein said first guiding structure is a first sliding means,
   wherein said second carriage is mounted on said first carriage by a second sliding means, and
   wherein said third carriage is mounted on said second carriage by a third sliding means.

3. A machine tool according to claim 2, wherein said first sliding means is orthogonal to said second sliding means, and
   wherein said second sliding means is orthogonal to said third sliding means.

4. A machine tool according to claim 2, wherein said first sliding means, second sliding means, and third sliding means are linear motion guide ways.

5. A machine tool according to claim 1, wherein said small parts machine tool is automatic and numerically controllable.

6. A machine tool according to claim 1, wherein said means attached to said base for moving a workpiece is a spindle.

7. A machine tool according to claim 1, further comprising a tool holder system mounted on said third carriage.

8. A machine tool according to claim 7, wherein said tool holder system is comprised of at least one tool holder block.

9. A machine tool according to claim 8, wherein at least one tool is attached to said at least one tool holder block.

10. A machine tool according to claim 9, wherein said at least one tool is held in said first coordinate direction.

11. A machine tool according to claim 9, wherein said at least one tool is held in said second coordinate direction.

12. A machine tool according to claim 9, wherein said at least one tool is held in said third coordinate direction.

13. A machine tool according to claim 9, wherein the spacing between said at least one tool and another said at least one tool is greater than the size of a workpiece to be machined.

14. A machine tool according to claim 9, wherein the spacing between said at least one tool and another said at least one tool is less than the size of a workpiece to be machined.

15. A machine tool according to claim 9, wherein said at least one tool is moved rotationally with respect to said third carriage and in relation to said third coordinate direction.

16. A machine tool according to claim 8, wherein at least one tool is attached to said at least one tool holder block by a clamping unit.

17. A machine tool according to claim 7, wherein said tool holder system is mounted on said third carriage by a sliding means.

18. A machine tool according to claim 17, wherein said sliding means are T-slot guide ways.

19. A machine tool according to claim 7, wherein said tool holder system is moved rotationally with respect to said third carriage and in relation to said third coordinate direction.

20. A machine tool according to claim 7, wherein said tool holder system is mounted on said third carriage by a T-shaped mounting structure.

* * * * *